US012370708B2

(12) United States Patent
Kearney et al.

(10) Patent No.: US 12,370,708 B2
(45) Date of Patent: Jul. 29, 2025

(54) FRAME MEMBER FOR USE WITH TREATMENT SHEET

(71) Applicant: The Gillette Company LLC, Boston, MA (US)

(72) Inventors: Robert Andrew Kearney, Reading (GB); Mark Peterson, Reading (GB); Anthony William Shorey, Thatcham (GB)

(73) Assignee: The Gillette Company LLC, Boston, MA (US)

( * ) Notice: Subject to any disclaimer, the term of this patent is extended or adjusted under 35 U.S.C. 154(b) by 529 days.

(21) Appl. No.: 17/721,436

(22) Filed: Apr. 15, 2022

(65) Prior Publication Data

US 2022/0332001 A1 Oct. 20, 2022

Related U.S. Application Data

(60) Provisional application No. 63/177,194, filed on Apr. 20, 2021.

(51) Int. Cl.
*B26B 21/40* (2006.01)
*A45D 27/00* (2006.01)

(52) U.S. Cl.
CPC .......... *B26B 21/4012* (2013.01); *A45D 27/00* (2013.01); *A45D 2200/1054* (2013.01)

(58) Field of Classification Search
None
See application file for complete search history.

(56) References Cited

U.S. PATENT DOCUMENTS

| | | | |
|---|---|---|---|
| 918,126 | A | 4/1909 | Clark |
| 1,744,280 | A | 1/1930 | Peterson |

(Continued)

FOREIGN PATENT DOCUMENTS

| | | | |
|---|---|---|---|
| CN | 111000625 | A | 4/2020 |
| CN | 210915683 | U | 7/2020 |

(Continued)

OTHER PUBLICATIONS

"Best Practices for Liquid Water-Based Adhesives", LD Davis Glues & Gelatins, URL: https://blog.lddavis.com/best-practices-for-liquid-water-based-adhesives, Posted online on Jan. 29, 2019, 10 pages.

(Continued)

*Primary Examiner* — Hwei-Siu C Payer
(74) *Attorney, Agent, or Firm* — Andres E. Velarde

(57) ABSTRACT

This invention relates to a novel personal care product having a flat treatment sheet having an upper surface and a perimeter area on the upper surface, a frame member having an underside surface and at least one tab, wherein the frame member is disposed over the perimeter area of the flat treatment sheet and the underside surface of the frame member is coplanar with the upper surface of the flat treatment sheet and the at least one tab extends below the lower surface of the treatment sheet. An upper product end of the personal care product includes a housing having at least one housing window. The at least one tab of the frame member is bent into the housing window. The frame member includes a flat or chamfered upper surface. The flat treatment sheet treats skin, removes hair, or a combination thereof.

8 Claims, 13 Drawing Sheets

(56) References Cited

U.S. PATENT DOCUMENTS

| | | | | | |
|---|---|---|---|---|---|
| 2,119,021 | A | | 5/1938 | Moskovies | |
| 2,223,286 | A | | 11/1940 | Johnson | |
| 2,614,321 | A | | 10/1952 | Charles | |
| 3,465,436 | A | * | 9/1969 | Pasquale | B26B 21/00 30/41 |
| 3,473,220 | A | | 10/1969 | Paul | |
| 4,324,041 | A | | 4/1982 | Trotta | |
| 4,964,214 | A | * | 10/1990 | Welsh | B26B 21/56 30/41 |
| 4,984,365 | A | | 1/1991 | Leonard et al. | |
| 5,018,274 | A | | 5/1991 | Trotta | |
| 5,490,329 | A | | 2/1996 | Chylinski | |
| 5,604,983 | A | | 2/1997 | Simms et al. | |
| 6,161,287 | A | | 12/2000 | Swanson et al. | |
| 9,539,734 | B1 | | 1/2017 | Bozikis et al. | |
| D791,960 | S | | 7/2017 | Guanying | |
| 2001/0003870 | A1 | | 6/2001 | Eichhorn | |
| 2012/0304467 | A1 | | 12/2012 | Garden, Jr. | |
| 2013/0031794 | A1 | | 2/2013 | Duff, Jr. et al. | |
| 2014/0100589 | A1 | | 4/2014 | Gordon et al. | |
| 2015/0133984 | A1 | | 5/2015 | Loreth | |
| 2020/0205859 | A1 | * | 7/2020 | Comstock | A61B 17/54 |
| 2021/0031387 | A1 | | 2/2021 | Paspatis | |
| 2022/0168912 | A1 | | 6/2022 | Abramsky | |
| 2022/0330983 | A1 | | 10/2022 | Kearney et al. | |
| 2022/0332001 | A1 | * | 10/2022 | Kearney | B26B 21/20 |

FOREIGN PATENT DOCUMENTS

| | | | |
|---|---|---|---|
| EP | 0276066 | A1 | 7/1988 |
| EP | 0305883 | A2 | 3/1989 |
| EP | 1306173 | A1 | 5/2003 |
| GB | 2114491 | A | 8/1983 |
| WO | 9955499 | A2 | 11/1999 |
| WO | 2020128706 | A1 | 6/2020 |

OTHER PUBLICATIONS

PCT Search Report and Written Opinion for PCT/US2022/025268 dated Jul. 19, 2022, 15 pages.

All Office Actions; U.S. Appl. No. 17/721,435, filed Apr. 15, 2022.

All Office Actions; U.S. Appl. No. 17/721,438, filed Apr. 15, 2022.

All Office Actions; U.S. Appl. No. 17/721,439, filed Apr. 15, 2022.

All Office Actions; U.S. Appl. No. 17/721,441, filed Apr. 15, 2022.

All Office Actions; U.S. Appl. No. 17/721,442, filed Apr. 15, 2022.

All Office Actions; U.S. Appl. No. 17/721,440, filed Apr. 15, 2022.

U.S. Appl. No. 17/721,435, filed Apr. 15, 2022 to Robert Andrew Kearney et al.

U.S. Appl. No. 17/721,438, filed Apr. 15, 2022 to Robert Andrew Kearney et al.

U.S. Appl. No. 17/721,439, filed Apr. 15, 2022 to Robert Andrew Kearney et al.

U.S. Appl. No. 17/721,441, filed Apr. 15, 2022 to Robert Andrew Kearney et al.

U.S. Appl. No. 17/721,442, filed Apr. 15, 2022 to Robert Andrew Kearney et al.

U.S. Appl. No. 17/721,440, filed Apr. 15, 2022 to Robert Andrew Kearney et. al.

Isaac Morey, "What does it mean when we say 100% RTV Silicone? ", Online retrieved from "https://siliconedepot.com/blog/what-does-it-mean-when-we-say-100-rtv-silicone", 2018, 04 Pages.

* cited by examiner

FRAME MEMBER FOR USE WITH TREATMENT SHEET

CROSS-REFERENCE TO RELATED APPLICATIONS

The present application is related to co-pending application Ser. No. 63/177,199 filed on the same date and by the same Assignee as the present application, which are not admitted to being prior art with respect to the present invention by its mention in the cross-reference section. This co-pending application is incorporated herein by reference in its entirety.

FIELD OF THE INVENTION

This invention relates to personal care products, and more particularly those products comprising both skin treatment and/or hair removal.

BACKGROUND OF THE INVENTION

In the prior art there are personal care products for either skin treatment or hair removal. Some known prior art discloses shavers for removing hair having blades with apertures, whereby the apertures have sharp cutting edges. In many instances, the blades in these shavers are retained utilizing one or more retaining members. The retaining members of prior art references, such as those disclosed in U.S. Pat. Nos. 5,604,983A and 4,984,365, retain foils in place by means of a unitary, generally annular, frame member which is arcuate or configured with a domed or convex surface to match the shape of the blades.

These blades are generally fabricated from metal. However, sharp cutting edges comprised of metal are prone to damage of the cutting edges during use, which requires regular replacement of the personal care product.

The foils, the selected materials and construction thereof, of these prior art shavers are specifically designed to remove hair and thus generally are not optimized for effective skin treatment purposes.

Other prior art discloses products for skin treatment that comprise either an abrasive surface such as skin files or graters such as US 2016/183978 whereby the foil is provided in a unitary arrangement that does not require a frame member.

Those personal care products optimized for, e.g. skin exfoliation or dermaplaning that comprise cutting edges are generally constructed from a metal foil with cutting edges that protrude beyond the surface of the foil. These protruding edges are uncomfortable and not effective and sharp enough for removing unwanted hair from the skin's surface.

The metallic foils in the art are generally formed and bowed to provide a convex or domed treatment surface for improving skin contact along curved skin surfaces. The disadvantage of this construction is that the skin contact area is minimal over extended flat body sites, such as the legs, chest or the back resulting in inefficient treatment that takes a long time to complete.

Clips disclosed in the art primarily aim to attach the treatment sheet to the personal care product. The clips of the prior art references utilize slots for mating with hooks in other shaver components or adhesive to retain the foil in place, respectively. Neither hooks and slots nor the use of adhesives can achieve the precise control of dimensions required for efficient and safe skin treatment and the mechanical stability to support foils fabricated from different materials which may include durable but brittle materials.

Furthermore, adhesives are not practical for manufacturing large quantities of sheet assemblies due to quality and automation difficulties. Other prior art clips used in wet shaving products are designed for retention of elongated, linear blades with cutting edges within a razor cartridge, such as for instance, U.S. Pat. No. 6,349,471B1, but these have the disadvantages that they retain the blades only at their ends, thereby providing limited support and excess clip material in areas of the cartridge not needing anything to be retained or protected.

The cutting edges of foils disclosed in the art are generally formed by coining and grinding of metal and are only present in the apertures. If durable, rigid materials such as ceramics or crystalline materials are used, processes such as etching may be employed to create the cutting edges.

It is desirable to provide a novel frame member for a personal care product having a novel treatment sheet comprising materials optimized for both skin treatment and hair removal.

It is also desirable to provide a novel frame member for a personal care product having a novel treatment sheet which is flat and rigid.

It is desirable to provide a novel frame member with features that provide robust construction with a novel treatment sheet that may be brittle.

It is desirable to provide a novel frame member for a personal care product that precisely sets the height of a novel treatment sheet and controls the flow of the skin over the treatment sheet.

SUMMARY OF THE INVENTION

The present invention is directed to a personal care product includes a flat treatment sheet having an upper surface and a perimeter area on the upper surface, a frame member having an underside surface and at least one tab, wherein the frame member is disposed over the perimeter area of the flat treatment sheet and the underside surface of the frame member is coplanar with the upper surface of the flat treatment sheet and the at least one tab extends below the treatment sheet.

In a preferred construction of the present invention, the flat treatment sheet is rigid. The flat treatment sheet can have a plurality of apertures with each of the plurality of apertures having an inner perimeter.

Still further, the personal care product includes an upper product end wherein the upper product end includes a housing wherein the housing has one or more of a housing step surface, a housing uppermost surface, a housing wall, at least one housing window, or any combination thereof.

In an embodiment of the present invention, the at least one tab is bent into the housing window. In another embodiment, the frame member includes a plurality of tabs.

In a preferred embodiment of the present invention, the flat treatment sheet treats skin, removes hair, or a combination thereof.

In another aspect of the present invention, the frame member includes a flat upper surface or a chamfered upper surface.

In accordance with the present invention, a frame member includes an upper surface having an outer perimeter and an inner perimeter, an outer wall proximal to the outer perimeter, a plurality of tabs extending from the outer wall, a section of the plurality of tabs including a bent portion, and a height at the outer perimeter greater than or equal to a height at the inner perimeter.

In one aspect of the present invention, the upper surface of the frame member is flat or chamfered. Also, the outer wall includes a plurality of straight sections joined with a plurality of corner sections, wherein the plurality of straight sections and the plurality of corner sections are interconnected.

In one embodiment of the present invention, the plurality of tabs extends from the plurality of straight sections.

Still further, the outer perimeter height is constant throughout the outer perimeter, the inner perimeter height is constant throughout the inner perimeter, or both. Also, the outer perimeter height and the inner perimeter height range from about 0.1 mm to about 0.5 mm.

Further still, the upper surface includes a rounded fillet at the inner perimeter, a rounded fillet at the outer perimeter, or both. The inner perimeter fillet includes an inner fillet radius, wherein the inner fillet radius ranges from about 0.05 mm to about 0.3 mm. In one preferred aspect, the outer perimeter may include a polygonal shape.

In yet another embodiment of the present invention, a frame member for a skin treatment product includes at least three straight sections, at least three corner sections, wherein each of the at least three corner sections join two of the at least three straight sections forming a polygonal shape.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

BRIEF DESCRIPTION OF DRAWINGS

While the specification concludes with claims particularly pointing out and distinctly claiming the subject matter that is regarded as the present invention, it is believed that the invention will be more fully understood from the following description taken in conjunction with the accompanying drawings.

DETAILED DESCRIPTION OF THE INVENTION

Figure 1A:
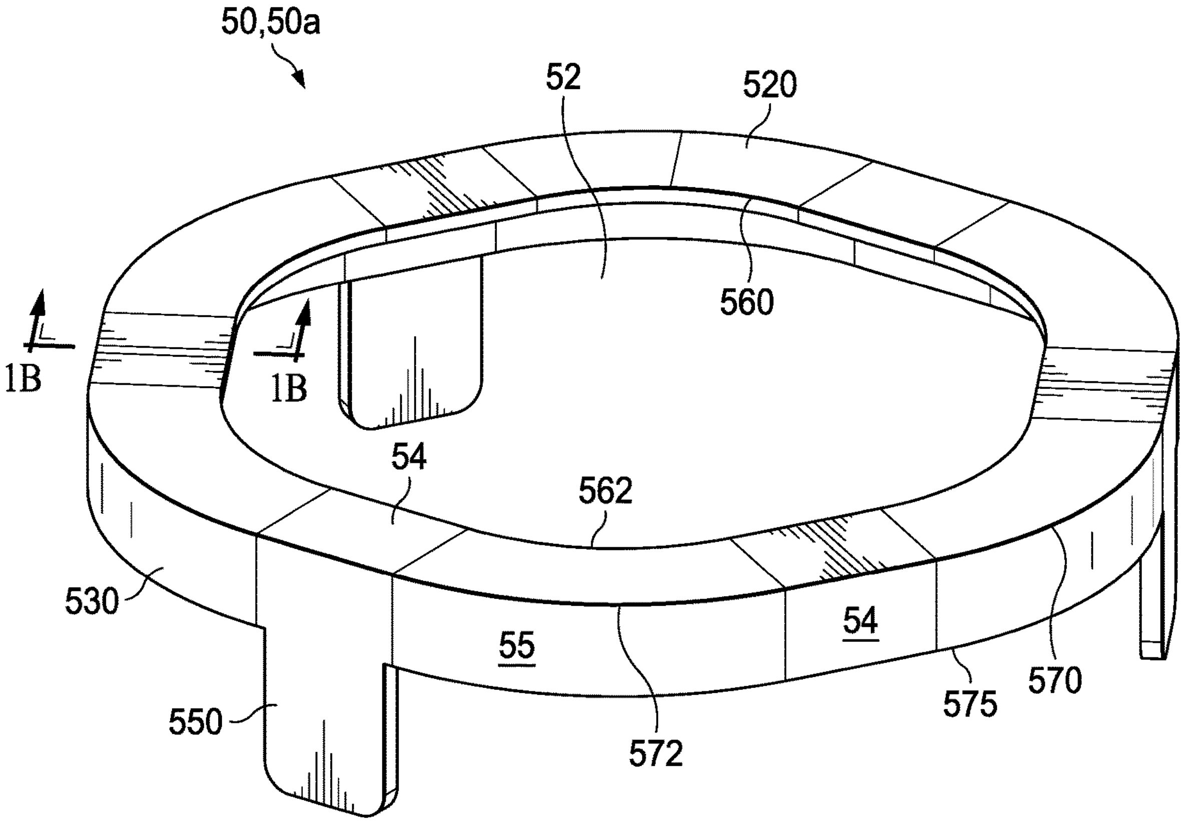
FIGS. 1A and 1B depict a perspective and cross-sectional view of an embodiment of a frame member of the present invention.

In the present invention, a personal care product that comprises a treatment sheet and a frame member whereby the frame member retains and aligns the treatment sheet for optimal use and performance on the skin.

The term "frame member" as used herein refers to the component on a personal care product utilized in retaining the treatment sheet to an upper surface of a housing of a personal care product or to the component itself. The frame member of the present invention is preferably comprised of interconnected segments that connect to form a singular or unitary element having s no distal ends. The frame member can be formed into any connected shape as will be discussed in more detail below. The frame member of the present invention can be comprised of any material including but not limited to aluminum, stainless steel, or plastic. It was determined that these materials are desirable as materials for the frame member of the present invention based on their mechanical and non-corrosive properties. In a preferred embodiment, aluminum is used because it is readily manufacturable (e.g., hard enough for machined from solid or stamped but sufficiently ductile to bend without breaking and retain its shape after bending). Specifically, the present invention determined that aluminum grade of 5000 series is beneficial.

The housing portion of the personal care product comprises an opening at the top and the treatment sheet is disposed to cover the opening of the housing. The treatment sheet comprises a plurality of apertures. The apertures may comprise straight and non-straight sections along the inner perimeter. Portions of the inner perimeter of each aperture are sharpened to provide a cutting edge. More durable cutting edges can be produced from materials like ceramic or crystals like silicon, sapphire or diamond. These materials are not ductile like metal and often are brittle, so they cannot be formed into e.g. a domed or convex shape but are available in planar sheets. The planar treatment sheets offer the additional advantage over personal care devices in the prior art in that a planar treatment sheet type surface increases the treatment efficiency, such as the removal of hair, or planning of skin on extended flat surfaces of skin such as legs, chest or back.

The frame member of the present invention also provides a skin contacting upper surface. The frame member has an outer perimeter greater than the outer perimeter of the treatment sheet and an inner perimeter smaller than the outer perimeter of the treatment sheet. Tabs along the outer surface of the frame member secure a treatment sheet, described below, to the housing so that the frame member covers the outer perimeter and frames the treatment sheet The frame member holds the treatment sheet in place so that the treatment sheet is not displaced relative to the housing as the product is moved around on the skin to exfoliate skin or cut hairs. The frame member has a skin contacting surface that is raised above the upper surface of the treatment sheet to control the flow of the skin over the surface of the treatment sheet that comprises the apertures. The skin contacting surface of the frame member may be flat, rounded, or chamfered. The frame member provides an interface or mating surface with the treatment sheet to mechanically stabilize the treatment sheet. It has been found that the height difference between the skin contacting surface of the frame member and the surface of the treatment sheet is critical for maintaining safe skin flow over the product and good contact with the skin surface for efficient treatment and that tight mechanical clamping between the frame member and the treatment sheet cannot otherwise be achieved with prior art solutions such as adhesives or plastic hooks into slots.

The term “treatment sheet” in the personal care product of the present invention refers to a planar sheet comprising a plurality of apertures. The periphery or perimeter of the apertures comprise cutting edges, used for removing hair and exfoliation or other treatments on skin.

The treatment sheet is desirably flat. A “flat” material generally has planar surfaces without protrusions or indentations. As used herein, “flat” and “planar” can be used interchangeably.

The treatment sheet is also desirably rigid. A “rigid” material signifies that the material is not flexible and cannot be easily bent.

The function of the treatment sheet in the personal care product is to both remove hair and to treat the skin and this is achieved by the structure of the treatment sheet noted above.

The treatment sheet of the present invention is desirably comprised of a solid, non-corroding material. The treatment sheet can be comprised of amorphous materials such as glass, crystalline materials such as silicon, diamond, sapphire, polycrystalline materials such as silicon, ceramic, or metals (e.g., steel), or any combination thereof. These materials can be shaped into rigid planar treatment sheets with apertures. Despite their rigidity, these materials can be fairly brittle. A “brittle” material is a material that generally fractures under load with little elastic or plastic deformation. The treatment sheet comprised of these materials, such as silicon and diamond, could shatter or break into pieces if the personal care product is dropped, if it is contacted with force, or takes the impact of a large force. Accordingly, the present invention bolsters the stability of the treatment sheet by providing a frame member.

Preferably, the treatment sheet substrate is comprised of a silicon material and the cutting edges are comprised of a diamond material.

Thus, the frame member can be considered a frame and the treatment sheet can be considered the glass behind the frame. Using this metaphor, the shape of the frame member preferably matches the shape of the outer perimeter of the treatment sheet, but slightly larger. As used herein, the terms “retaining member” and “frame member” can be used interchangeably.

While the treatment sheet is desirably comprised of a rigid (e.g., not bendable) material, the frame member of the present invention is desirably comprised of a material that can be formed and shaped without breaking and retains its shape after bending.

Any permutations of shapes of the treatment sheet, the frame member, the apertures, and sizes thereof are contemplated in the present invention. Moreover, any feasible pattern and location of apertures is also contemplated in the present invention.

The term “about” as used herein generally signifies approximately or around. When a range of numerals are given, e.g., “about 4 to about 40” is disclosed herein, the present invention contemplates +/−10 percent of each number. Thus, for clarity, if a reference is described as being “about 4 to about 40” signifies the range of “3.6 to 44” as being encompassed by the present invention since the range of 3.6 to 4.4 represents +/−10 percent of 4 and the range of 36 to 44 represents +/−10 percent of 40.

The present invention contemplates a frame member 50 having several embodiments shown as frame members 50A-50D of FIGS. 1A-1G. As depicted in FIGS. 1A, 1C, 1E and 1G, the frame members are not mounted to any surface or product and have a generally hexagonal shape with an opening 52 therethrough, though any size and shape is contemplated for the frame members of the present invention including but not limited to round, elliptical, square, or any other irregular shape. Alternative embodiments for shapes and sizes of the frame member of the present invention are shown in FIG. 9 below. The opening 52 is sized and shaped to accommodate a treatment sheet as will be described below.

The frame members 50A-50D of the present invention generally comprise a plurality of sections, which may be straight or curved, or a combination thereof. In each of the embodiments shown in FIGS. 1A to 1D, there are six straight outer edge sections 54 and six corner sections 55 to form a frame member in a hexagonal geometrical shape. The straight sections 54 serve to ease the orientation and alignment of the product during use and the corner sections 55 provide comfort during use when the product is pressed against the skin or when rotated.

Turning to FIG. 1A, a perspective top view embodiment 50*a* of a frame member 50 of the present invention having a plurality of tabs 550 is shown. Frame member 50*a* also includes a flat upper surface 520 which desirably serves to contact the skin of a user. The upper surface 520 is desirably smooth to provide a beneficial glide on the skin. The flat upper surface 520 on the frame member is beneficial because it provides for the maximum contact of the upper surface 520 with the user’s skin.

The frame member 50*a* comprises an outer perimeter 570 having a plurality of outer perimeter corners 572. In the case of a hexagon, as shown in FIG. 1A, there are thus six outer perimeter corners 572 that are all interconnect to form the hexagonal frame member. Frame member 50*a* further comprises an inner perimeter 560 having a plurality of inner perimeter corners 562. In the case of a hexagon, as shown in FIG. 1A, there are thus six inner perimeter corners 562.

In the present invention, the outer perimeter 570 of the frame member 50*a* is larger than the inner perimeter 560 of the frame member 50*a*. The outer perimeter 570 has a length that may generally range from about 55 mm to about 65 mm, and preferably is about 60 mm.

The inner perimeter 560 may generally range from about 50 mm to about 60 mm, and preferably is about 55 mm.

In FIG. 1A, frame member 50*a* has a flat upper surface 520 with no rounded perimeters.

Figure 1B:
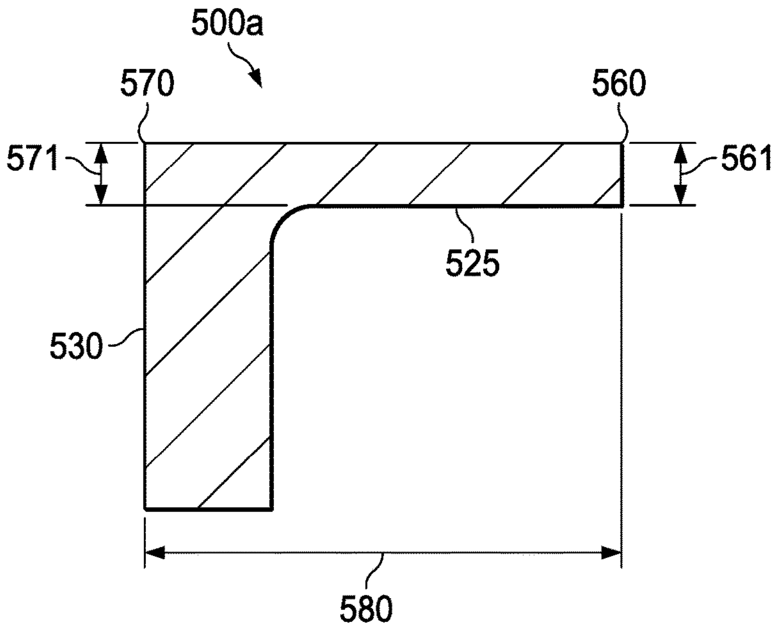

A cross-sectional view 500*a* of frame member 50*a* is shown in FIG. 1B taken along plane 1B-1B of frame member 50*a*.

As shown in this cross-sectional view 500*a*, the outer perimeter height 571 is measured and defined as the perpendicular distance from the uppermost surface at the outer perimeter 570 to the underside surface 525 of the frame member 50*a*. Inner perimeter height 561 is measured and defined as the perpendicular distance from the uppermost surface at the inner perimeter 560 shown in FIG. 1B to the underside surface 525 of the frame member 50*a*.

As depicted in the cross-sectional view 500*a*, the outer perimeter height 571 of the frame member 50*a* taken at the outer perimeter 570 is the same as the inner perimeter height 561 taken at the inner perimeter 560. For frame member 50*a* in FIG. 1B, both outer perimeter height 571 and inner perimeter height 561 range from about 0.1 mm to about 0.5 mm and preferably 0.3 mm.

Having a constant height is advantageous because during use, the personal care product of the present invention is turned in many directions (e.g., on facial skin) but regardless of the position, the product having a constant height at both inner and outer perimeters will engage the user's skin in a constant manner.

Also shown in cross-sectional view 500*a* of FIG. 1B is an outer wall 530 and frame width 580 of the frame member 50*a*. Generally, the frame width 580 of the present invention frame 50 is about 1.5 mm and is desirably the same width regardless of which embodiment (50A-50D) of frame member.

Figure 1C:
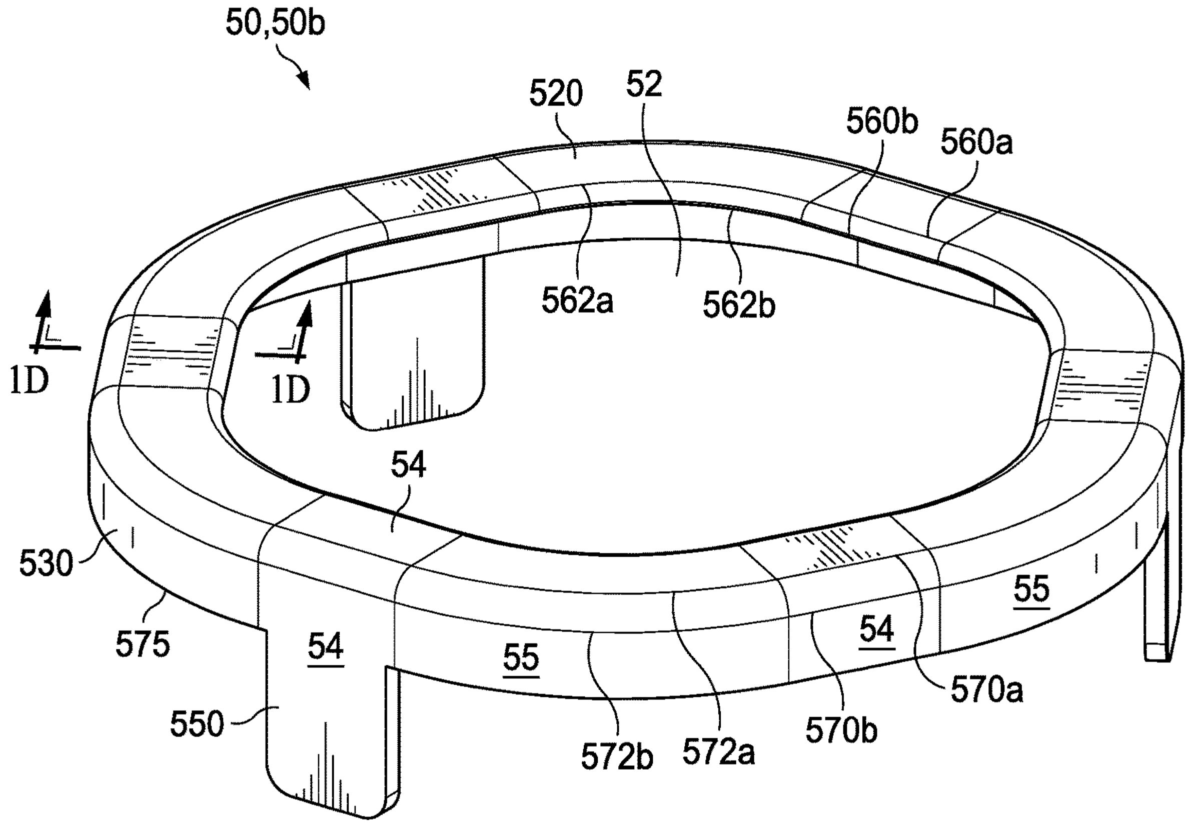
FIGS. 1C and 1D depict a perspective and cross-sectional view of an alternate embodiment of a frame member of the present invention.

FIG. 1C shows embodiment 50*b* of the frame member 50 of the present invention having a plurality of tabs 550. The frame member 50*b* comprises a top outer perimeter 570*a* and a side outer perimeter 570*b* having a plurality of top outer perimeter corners 572*a* and side outer perimeter corners 572*b*, respectively. In the case of a hexagon shape, as shown in FIG. 1C, there are six top outer perimeter corners 572*a* and six side outer perimeter corners 572*b*. Frame member 50*b* further comprises a top inner perimeter 560*a* and a side inner perimeter 560*b* having a plurality of inner perimeter corners 562*a* and 562*b*, respectively. In the case of a hexagon shape, as shown in FIG. 1C, there are thus six top inner perimeter corners 562*a* and six side inner perimeter corners 562*b*.

In the present invention, the outer perimeters 570*a* and 570*b* of the frame member 50*b* are larger than the inner perimeters 560*a* and 560*b* of the frame member 50*b*. The outer perimeters 570*a* and 570*b* may each generally range from about 55 mm to about 65 mm, and preferably are about 60 mm. The inner perimeters 560*a* and 560*b* have a length that may generally range from about 50 mm to about 60 mm, and preferably is about 55 mm.

Figure 1D:
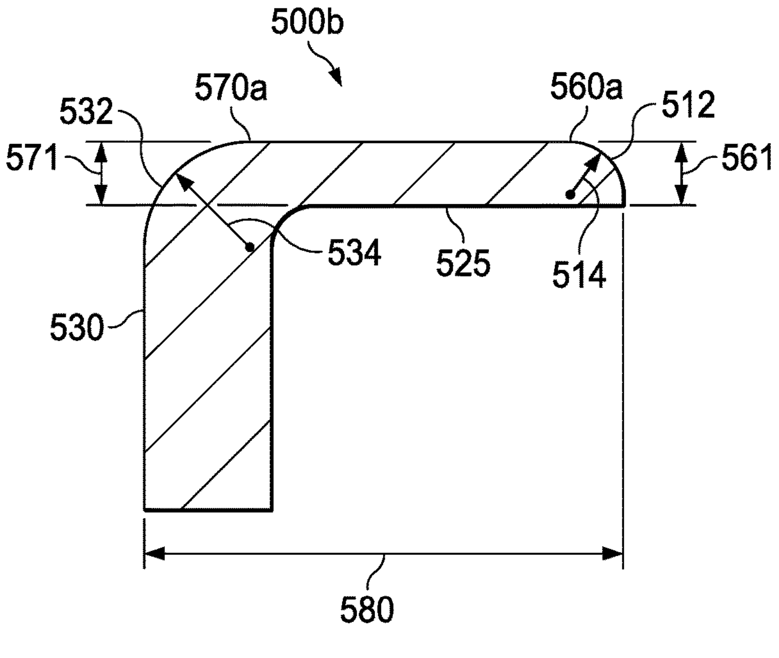

Upper surface 520 of frame member 50*b* is substantially flat as in FIG. 1A. However, as shown in FIG. 1D, a main difference between frame member 50*b* and frame member 50*a* of FIG. 1A is that the upper surface 520 of frame member 50*b*, comprises rounded edges or fillets, namely inner fillet 512 at the top inner perimeter 560*a* and outer fillet 532 at the top outer perimeter 570*a*.

Thus, the top inner perimeter 560*a* on the skin contacting surface 520 of frame member 50*b* may be rounded by the inner fillet 512 having an inner fillet radius 514. The inner fillet radius 514 ranges from about 0.05 mm to about 0.3 mm.

The top outer perimeter 570*a* on the skin contacting surface 520 of frame member 50*b* may be rounded by the outer fillet 532 having an outer fillet radius 534. The outer fillet radius 534 ranges from about 0.05 mm to about 0.3 mm.

Having radii of curvature or rounded areas at the inner and outer fillets of the frame member of the present invention desirably provides maximum comfort and ease of use to a user as they use the personal care product by moving it any direction over the skin surface.

A cross-sectional view 500*b* of frame member 50*b* is shown in FIG. 1D taken along plane 1D-1D of frame member 50*b*.

As shown in cross-sectional view 500*b*, the outer perimeter height 571 is measured as the perpendicular distance from the uppermost surface at the top outer perimeter 570*a* to the underside surface 525 of the frame member 50*b*. Inner perimeter height 561 is measured and defined as the perpendicular distance from the uppermost surface at the top inner perimeter 560*a* shown in FIG. 1B to the underside surface 525 of the frame member 50*b*.

Thus, even with rounded fillets 512 and 532, the outer perimeter height 571 of the frame member 50*b* taken at the top outer perimeter 570*a* is generally the same as the inner perimeter height 561 taken at the top inner perimeter 560*a*. For frame member 50*b* in FIG. 1B, outer perimeter height 571 ranges from about 0.1 mm to about 0.5 mm and is preferably 0.3 mm.

Also shown in cross-sectional view 500*b* of FIG. 1D are an outer wall 530 and frame width 580 of the frame member 50*b*.

Figure 1E:
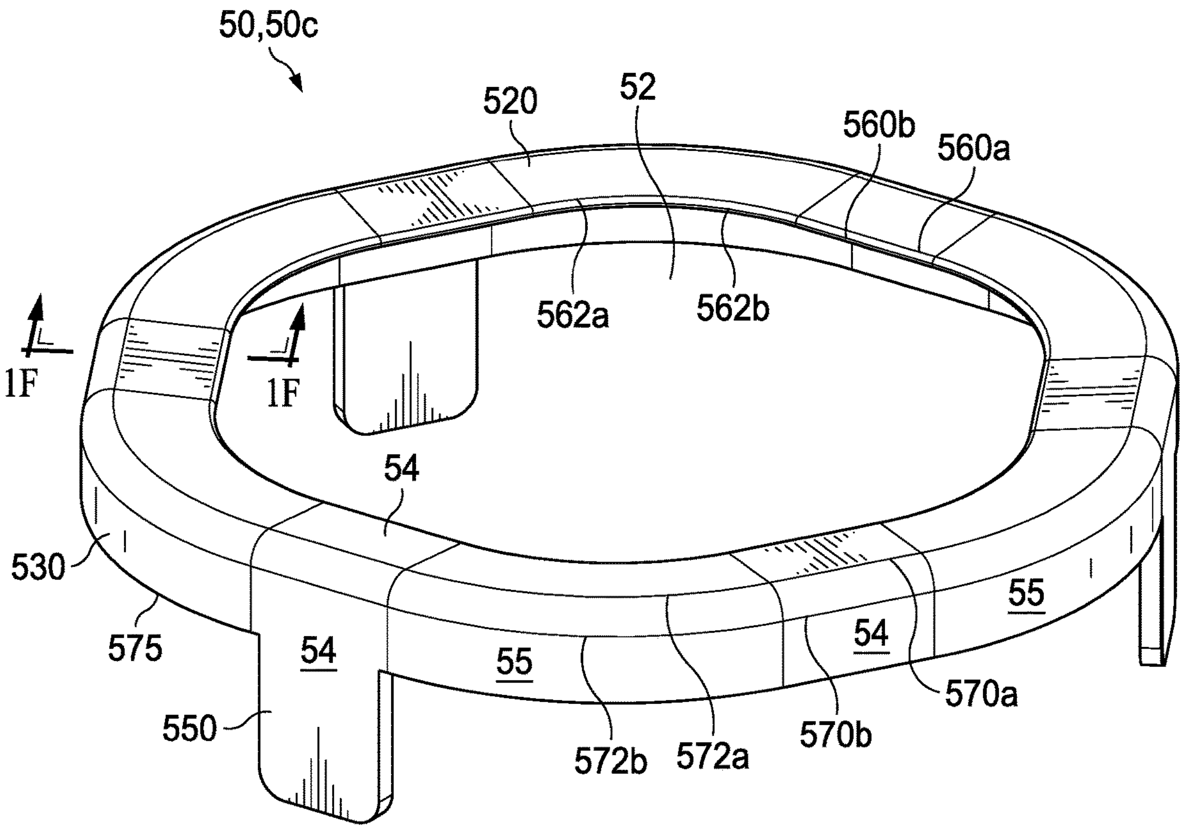
FIGS. 1E and 1F depict a perspective and cross-sectional view of another alternate embodiment of a frame member of the present invention.
Figure 1F:
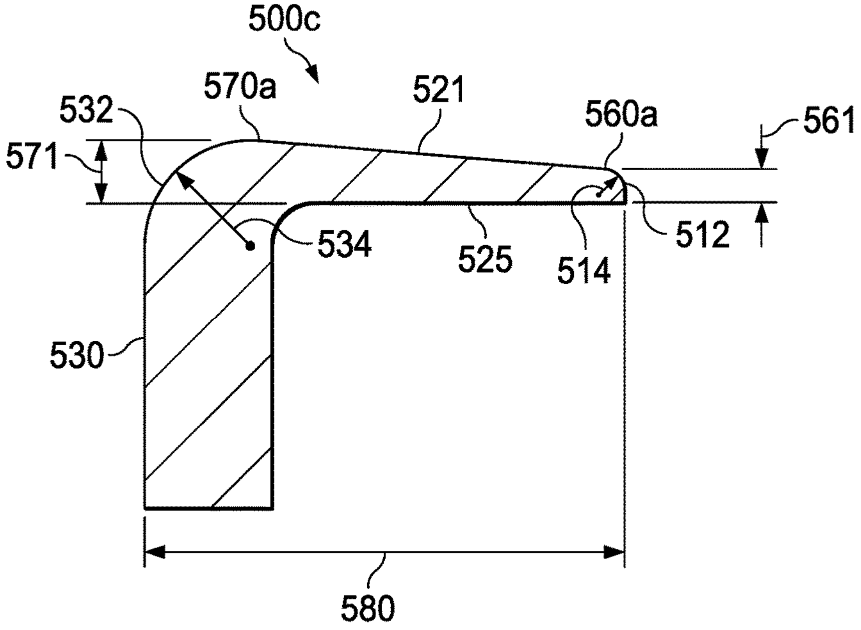

FIGS. 1E and 1F shows yet another embodiment of the frame member 50*c* of the present invention having a plurality of tabs 550. The frame member 50*c* of FIG. 1E differs from retaining members 50*a* and 50*b* of FIGS. 1A and 1C, respectively, in that upper surface 520 of FIG. 1E comprises a slope or a chamfer 521. The frame member 50*c* of FIG. 1E is otherwise nearly identical to that of frame member 50*b* of FIG. 1C, including comprising rounded edges or fillets 512 and 532, and respective radii 514 and 534.

A cross-sectional view 500*c* of frame member 50*c* is also shown in FIG. 1F taken along Plane 1F-1F of frame member 50*c*. As shown in cross-sectional view 500*c*, the outer perimeter height 571 is measured as the perpendicular distance from the uppermost surface at the top outer perimeter 570*a* to the underside surface 525 of the frame member 50*c*. Inner perimeter height 561 is measured from the uppermost surface at the top inner perimeter 560*a* to the underside surface 525 of the frame member 50*c*.

However, unlike FIG. 1D, the outer perimeter height 571 of the frame member 50*c* taken at the top outer perimeter 570*a* is not the same as the inner perimeter height 561 taken at the top inner perimeter 560*a*. Desirably, outer height 571 is larger than inner height 561. For FIG. 1F, outer perimeter height 571 ranges from about 0.2 mm to about 0.4 mm and is preferably 0.3 mm and inner perimeter height 561 ranges from about 0.14 mm to about 0.18 mm and is preferably 0.16 mm.

The chamfered face or the downward slope 521 of frame member 50*c* enable a user's skin to smoothly flow down from the highest point of the frame member at the top outer perimeter 570*a* to the lower point at the top inner perimeter 560*a*.

Also shown in cross-sectional view 500*c* of FIG. 1F are an outer wall 530 and frame width 580 of the frame member 50*c*.

As noted above, each of the embodiments 50*a*, 50*b* and 50*c* of frame member 50 in FIGS. 1A, 1C and 1E comprise a plurality of tabs 550. These tabs 550 are used to assist in retaining and framing a treatment sheet (shown and described below) onto a housing 20 or the upper product end 11. The tabs shown in FIGS. 1A, 1C and 1E extend generally planar to the outer wall 530. However, upon assembly of the product (described below) these tabs 550 may preferably be bent as shown in FIG. 1G of the present invention.

Figure 1G:
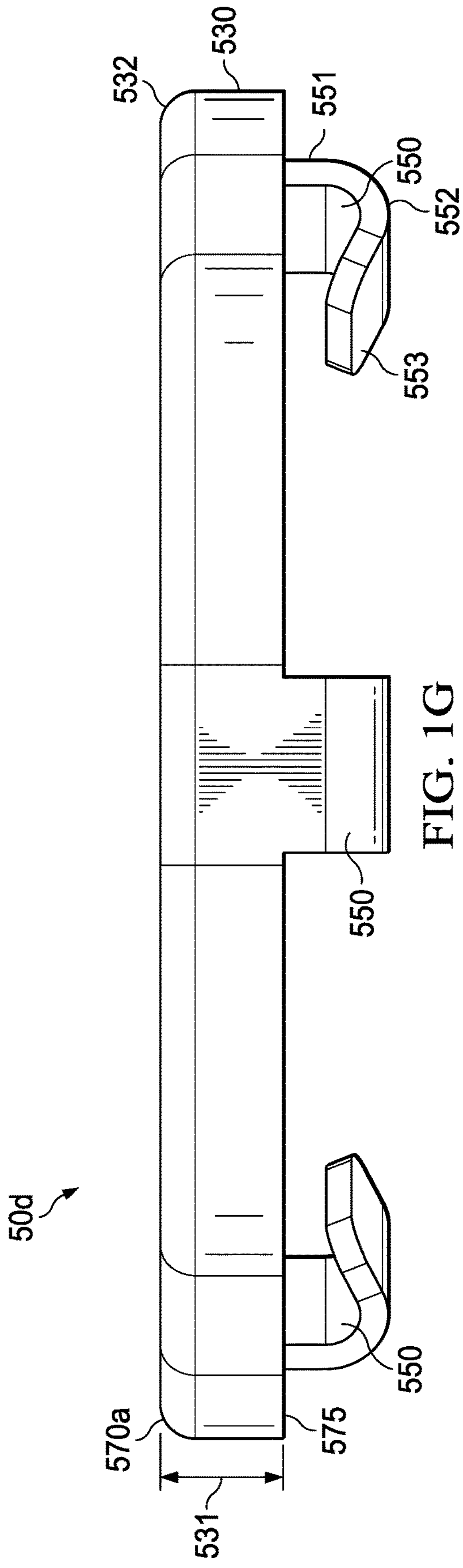
FIG. 1G depicts a side view of an embodiment of a frame member having bent tab portions in accordance with the present invention.

Turning now to FIG. 1G, a side view of frame member 50*d* of the present invention is shown having bent tab portions. While frame member 50*d* of FIG. 1G represents frame member 50*b* of FIG. 1C, the embodiments of frame members 50*a* and 50*c* in FIGS. 1A and 1E, respectively are also contemplated. Frame member 50*d* has an outer wall height 531 (not inclusive of the tabs 550, which extend from the outer surface 530). Desirably outer wall height 531, is taken from the frame member upper outer perimeter 570*a* to the lower outer perimeter 575 and is constant around the entire frame member. The outer wall height 531 of the frame member 50*d* desirably ranges from about 1.0 mm to about 3.0 mm, and preferably the outer wall height 531 is 1.75 mm. The main benefit of having a constant outer wall height around the perimeter of any of the embodiments of frame members 50 of the present invention is that, during use, the product is used in many directions but regardless of the position, the product having a constant outer wall height will engage the user's skin in the same or constant manner. Other dimensions of the frame members 50 of the present invention and its relationship with the treatment sheet will be described in detail below.

FIG. 1G also shows tabs 550 extending from the frame member's outer wall 530 whereby each of tabs 550 comprise a tab upper section 551, a tab center section 552 (which comprises a bent portion in FIG. 1G), and a tab end section 553. The bent portion 552 of the tab desirably functions to retain the treatment sheet onto the housing of the product as will be described below. Further details of the tab are described below with regard to FIGS. 2A to 2D.

Figure 2A:
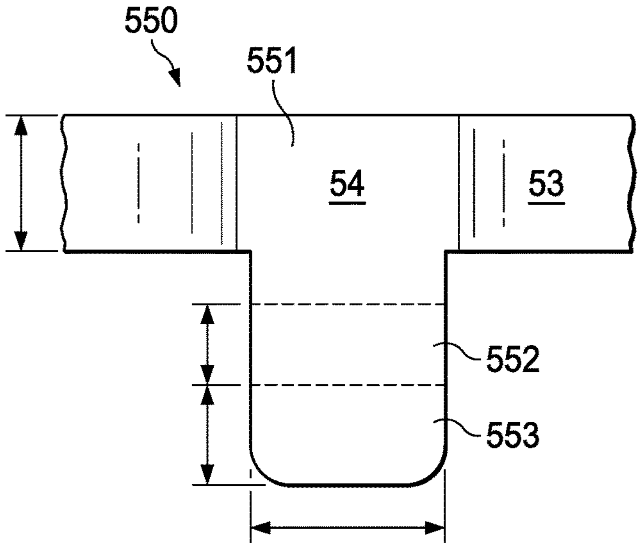
FIGS. 2A-2D depict close-up views of the tab portion of the frame member of the present invention.
Figure 2B:
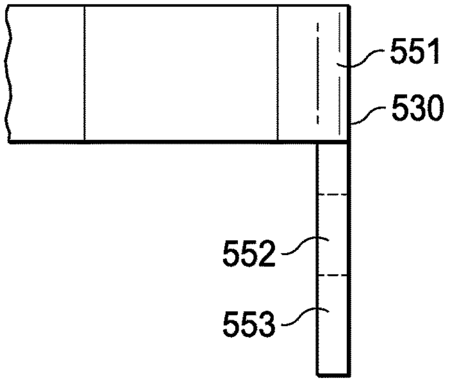

Referring now to FIGS. 2A to 2D, views of the tab 550 of the present inventions are shown. In FIGS. 2A and 2B, front and side views, respectively, of a flat, nearly rectangular tab 550 (as shown in FIGS. 1A, 1C and 1E) of the present invention are shown (e.g., prior to any bending of the tab 550). The tab 550 extends from straight portion 54 of the outer wall 530 of the frame member 50 though the tab 550 may extend from any portion of the outer wall of the frame member (not shown). The tab 550 comprises tab upper section 551, tab center section 552, and tab end section 553. Tab center section 552 is not bent in FIGS. 2A and 2B. The tabs shown in FIGS. 2A and 2B, generally have a length of 2 to 6 mm and a width of 2 to 5 mm.

Figure 2C:
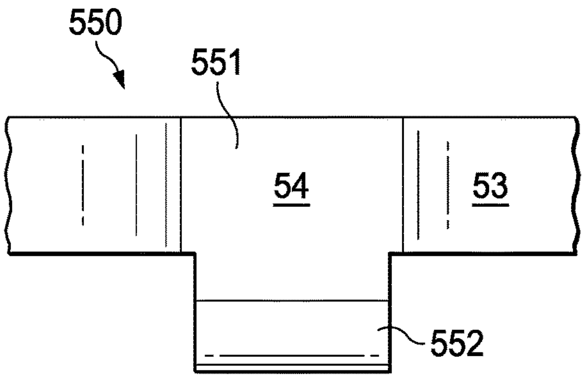
Figure 2D:
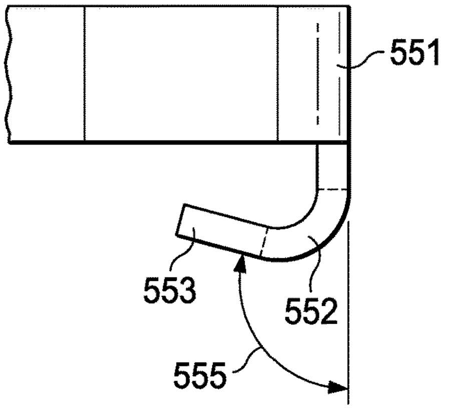

In FIGS. 2C and 2D, front and side views of the tab 550 of the present invention are shown having a bent portion in the tab center section 552 between the tab upper section 551 and the tab end section 553. The tabs are bent during assembly to assist in framing and retaining a treatment sheet in a personal care product as described in FIGS. 7 and 8 below. Desirably, a tab bend angle 555 formed at the bottom of the bent portion 552 is greater than 90 degrees and preferably 95 to 135 degrees.

Any size and shape of the tabs 550 is contemplated in the present invention and can be designed in accordance with the housing and treatment sheet components. As such, wider or narrower or alternate shapes (not shown) of tabs can be operably utilized.

As will be described below, the tabs (e.g., the tab end section and tab bent portion) may engage, be joined to, or rest in recesses, notches or channels in the housing 20 and/or may similarly be disposed through windows in the housing.

Figure 3A:
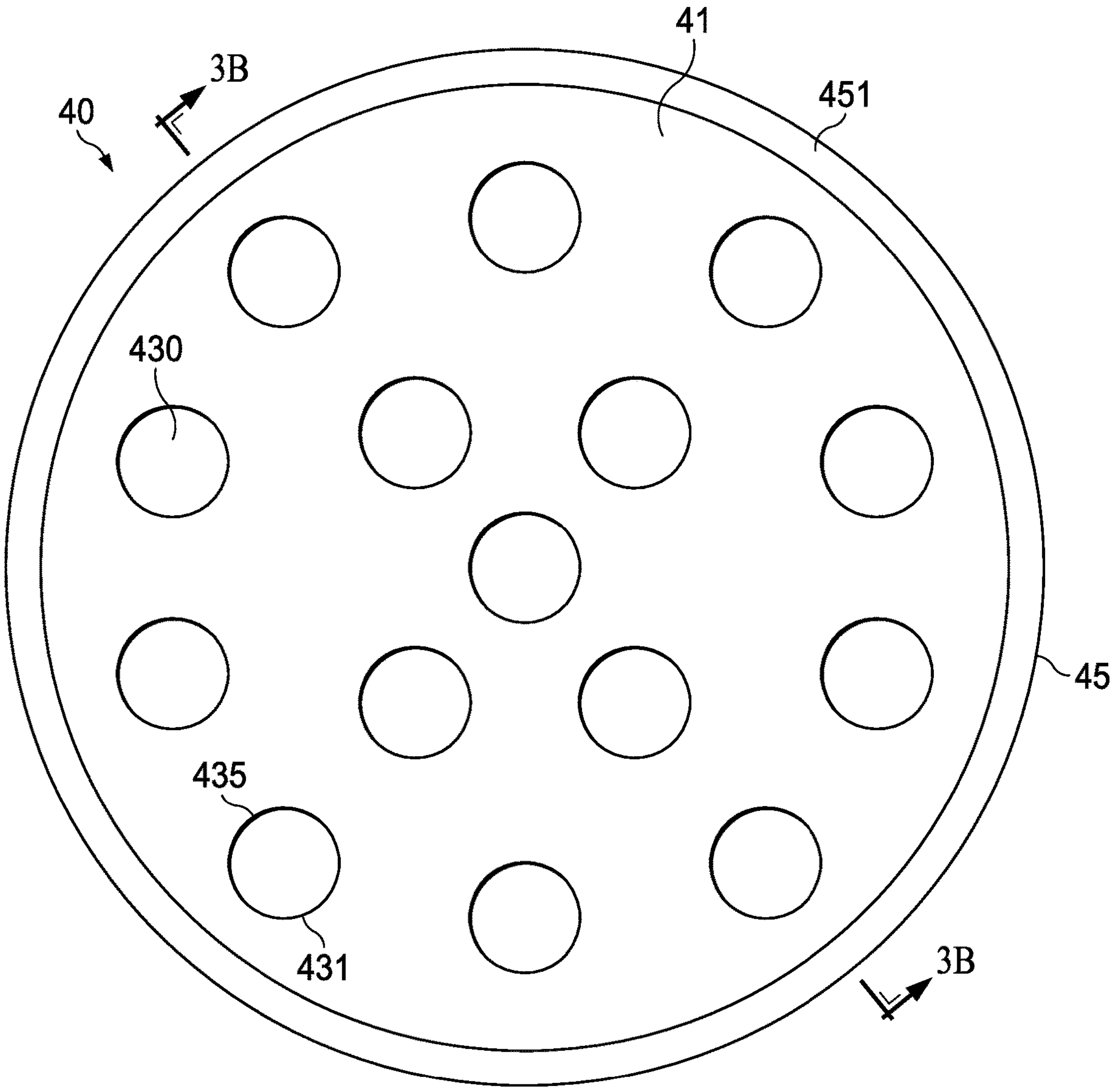
FIG. 3A is a top view of a treatment sheet in accordance with the present invention.
Figure 3B:
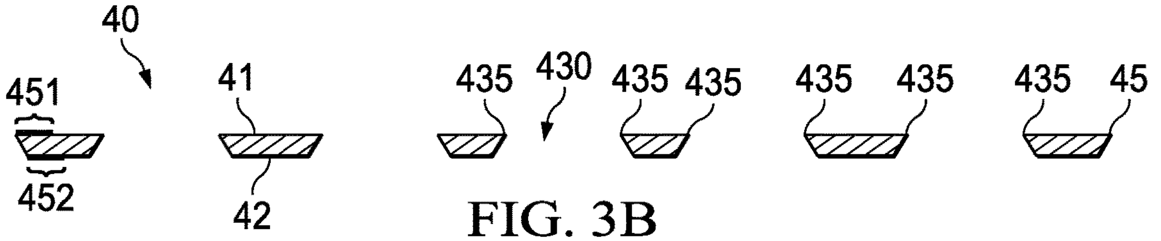
FIG. 3B is a cross-sectional view of a portion of the treatment sheet taken along plane A-A of FIG. 3A.
Figure 4:
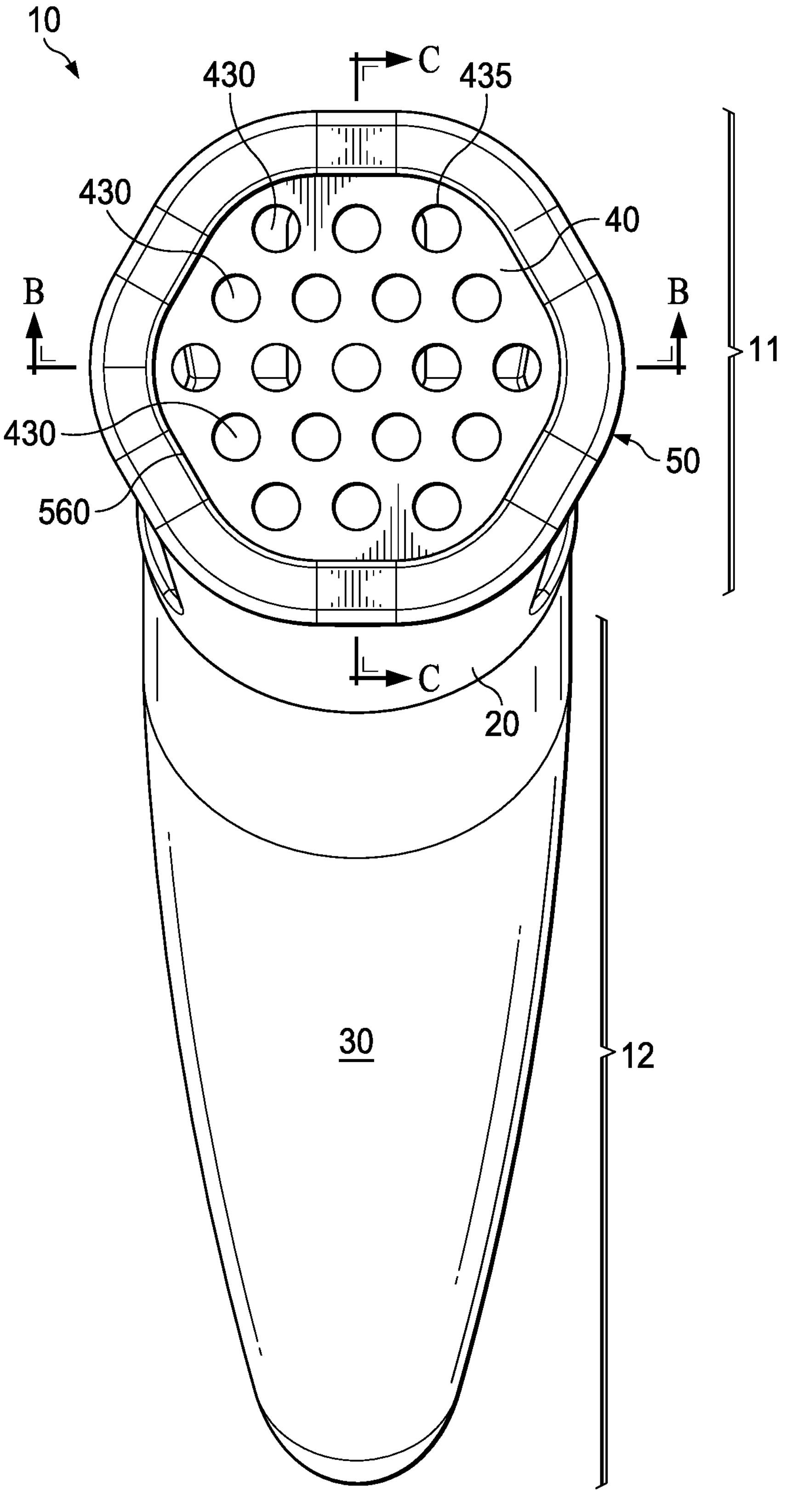
FIG. 4 is a top view of a personal care product of the present invention.
Figure 5:
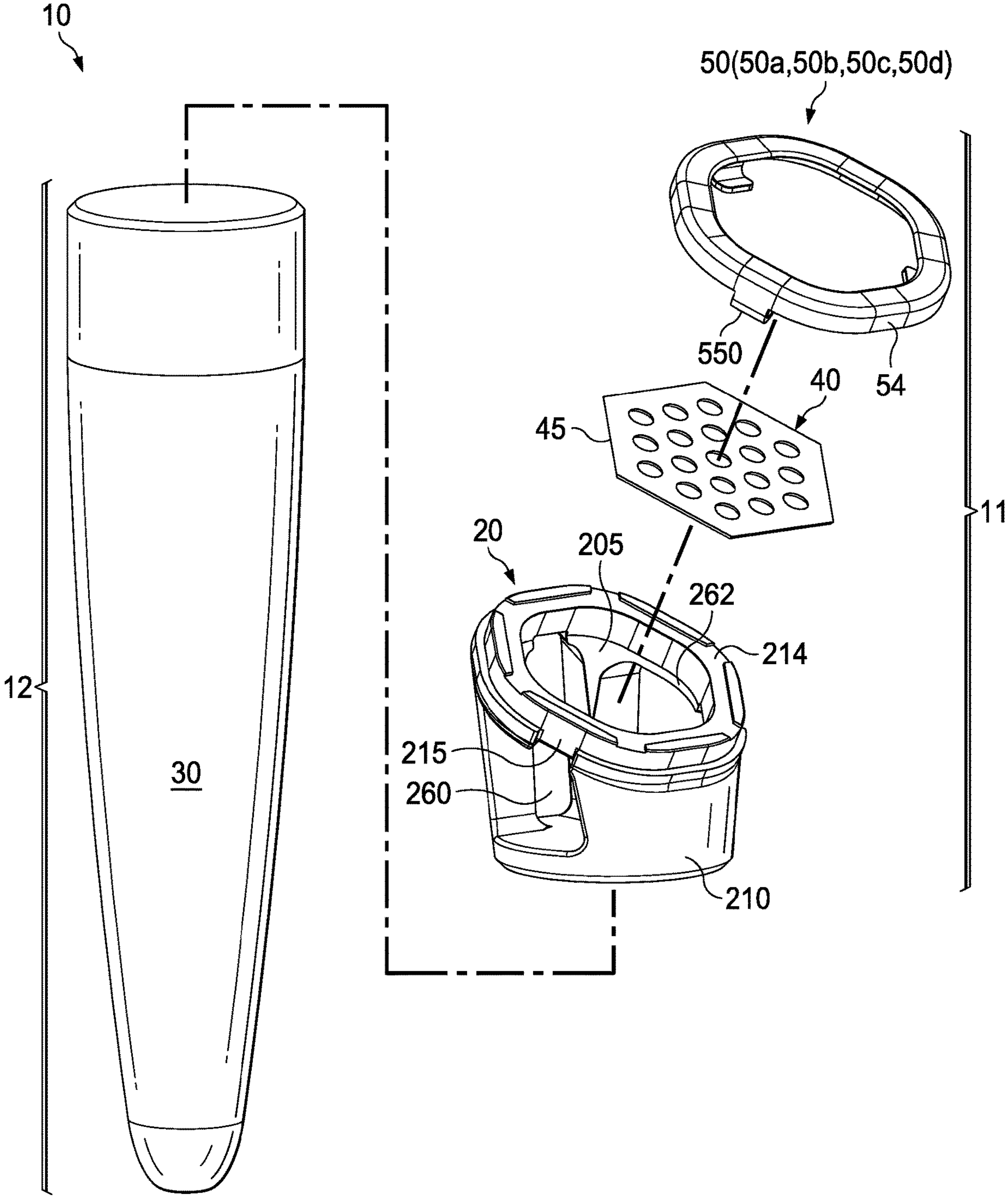
FIG. 5 is an exploded side perspective view of the personal care product of FIG. 4.

A treatment sheet 40 according to the present invention is shown in FIGS. 3A and 3B. A round shaped treatment sheet 40 is shown, though any shape is contemplated in the present invention. For instance, as depicted in FIGS. 4 and 5 a personal care product is shown having a hexagonal treatment sheet. Preferably, as in FIGS. 4 and 5, the treatment sheet and the frame member have a similar shape. A top view of the treatment sheet 40 is shown in FIG. 3A. The treatment sheet 40 is desirably flat and rigid and generally comprised of a brittle material such as glass or semiconductor. The treatment sheet 40 comprises a top surface 41, an outer perimeter 45, and a plurality of apertures 430. The top surface 41 is a skin contacting surface when the treatment sheet 40 is disposed in a personal care product (e.g., see FIG. 4). The apertures 430 are arranged in a format such that they do not extend to the perimeter 45 or the outer perimeter area 451 of the treatment sheet. As shown in FIG. 3A, the apertures 430 have a round or circular shape, though apertures 430 are contemplated to be any feasible shape.

Each aperture 430 has an inner perimeter 431, a portion, or all, of which forms a cutting edge 435. It is these cutting edges 435, formed along perimeters of the treatment sheet apertures that perform the skin treatment and hair removal functions of the personal care product of the present invention. Cutting edges 435 are described further below with regard to FIG. 3B.

FIG. 3B is a cross-sectional view taken along the plane 3B-3B of FIG. 3A depicting cutting edges 435 of apertures 430 of the present invention. Also shown in FIG. 3B are upper perimeter area 451 and opposing lower perimeter area 452. These perimeter areas play a role during assembly and will be described below.

Importantly, and as shown in FIG. 3B, cutting edges 435 do not protrude above the skin contacting upper surface 41 of the treatment sheet 40. This coplanarity of the cutting edges and the treatment sheet shown in FIG. 3B is a distinguishable aspect over the prior art and is preferred in the present invention as it has been determined to provide improved comfort and optimized safety and doing so while both exfoliating skin and removing hairs from the skin, thereby further distinguishing over the prior art Referring to FIG. 4 a front view of a personal care product 10 is shown having a frame member 50 of the present invention disposed over a treatment sheet 40. The personal care product 10 further comprises an upper product end 11 and a lower product end 12. The upper product end 11 includes a housing 20, upon which the treatment sheet 40 and frame member 50 are disposed. The lower product end 12 allows the user to hold the product in the hand. As shown, all of the cutting edges 435 and apertures 430 are disposed within the inner perimeter 560 of the frame member 50.

FIG. 5 depicts an exploded side perspective view of the personal care product 10 of FIG. 4 showing its main components, namely the frame member 50 of the present invention the treatment sheet 40, and the handle 30. The product 10 comprises an upper product end 11 and a lower product end 12. The upper product end 11 includes a housing 20 upon which first the treatment sheet 40 and then the frame member 50 are preferably disposed. The housing 20 or the upper product end 11 may be permanently attached to the lower product end 12 or the housing 20 or the product upper end 11 may be releasable from the lower product end 12. The housing comprises an upper surface 214 with a top opening

205 and a housing wall 210 with a plurality of housing windows 260 therethrough. The upper surface 214 may include one or more housing upper surfaces such as a housing step surface 211, a housing step 212, and a housing uppermost surface 213 as shown further below in FIGS. **6*a* to 8. Though any tab is contemplated in the present invention, the tabs 550 of the frame member 50 shown in FIG. 5 are bent (e.g., of the type depicted in FIGS. 1G, 2C, and 2D) and will preferably extend around or into the housing wall 210 and into housing windows 260** (as will be described in more detail below). By extending around or into the housing wall or windows, the tabs allow the frame member to be joined with the housing. This coupling or engagement of the tabs and the housing provide desired benefits of aligning and retaining the treatment sheet. Desirably, the number of tabs is equal to the number of housing windows, though any number of tabs and windows are contemplated in the present invention.

Housing windows 260 are open areas provided in the housing 20 and preferably formed in the housing wall 210. The housing windows 260 serve not only to aid the tabs 550 in framing and retaining the treatment sheet 40 on the housing 20 but also as an aid in rinsing the debris produced or accumulated during use of the personal care product 10. Debris may include dead skin cells, hairs (e.g., including vellus hair), treatment or shave preparations, dirt, oils, and other matter removed from the outer surface of the skin or applied to the surface of the skin during use.

Further benefits of the embodiments of frame member 50 of the present invention include, but are not limited to, providing an alignment or guiding outer edge on the skin through the use of the straight portions 54 on the upper perimeters to improve skin contact and flow, and generally framing and providing stability to the treatment sheet thereby reducing shattering of the brittle treatment sheet if dropped.

Figures 6A, 6B, 6C:
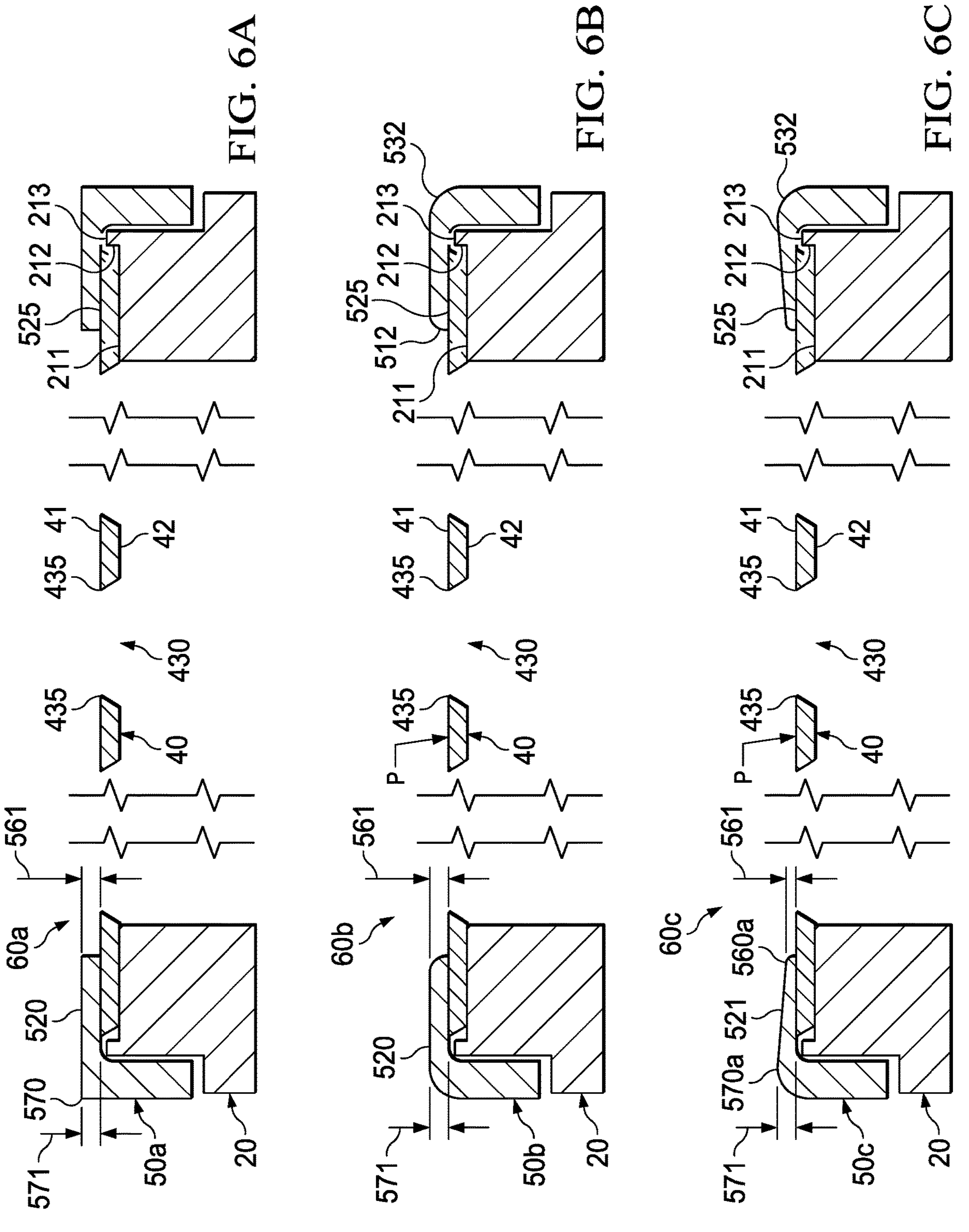
FIGS. 6A-6C are cross-sectional views of portions of a frame member, holder, and treatment sheet of a personal care product of the present invention.

Referring now to FIGS. 6A to 6C, cross-sectional views of the top portions of the upper product end 11 are shown. In FIGS. 6A to 6C, the treatment sheet 40 is "sandwiched" between the frame member 50 and the housing 20 such that the upper skin contacting surface 41 of the treatment sheet is coplanar to an underside surface 525 of the frame member 50 and the lower surface 42 of the treatment sheet 40 is coplanar with housing upper surfaces, and in particular, as shown, the housing uppermost surface 213 and/or the housing step surface 211. Apertures 430 and cutting edges 435 of the treatment sheet 40 are generally disposed within the top opening of the housing 20 such that the apertures 430 are see-through. Turning first to FIG. 6A, a cross-sectional view **60*a* along plane B-B in FIG. 4 is shown where treatment sheet 40 of the present invention is sandwiched between the frame member 50*a* of FIG. 1A and the housing 20. As shown, a portion of the upper skin contacting surface 41 of the treatment sheet is coplanar to the underside surface 525 of the frame member 50*a* and a portion of the lower surface 42 of the treatment sheet 40 is coplanar with the housing step surface 211 or housing uppermost surface 213. The housing 20 may comprise a housing step wall 212 which is disposed between the housing step surface 211 and the housing uppermost surface 213 aiding in the location of the treatment sheet 40 on the housing, and ultimately in the entire assembly. A more detailed description of assembly of the housing 20, the treatment sheet 40 and the frame member 50 (e.g., 50*a*, 50*b*, 50*c*, 50*d*) of the present invention is described below with regard to FIGS. 7 and 8**.

As noted above in conjunction with FIG. 1A and as depicted in FIG. 6A, frame member **50*a* has a flat upper surface 520, e.g., no chamfer or no rounded fillets along the perimeters. The outer height 571 of the frame member 50*a* taken at the outer perimeter 570 is the same as the inner height 561 taken at the inner perimeter 560. In this way, regardless of the position, the product 10** will have a constant height at both inner and outer perimeters of the frame member and will beneficially engage the user's skin in a constant manner.

A cross-sectional view **60*b* along plane B-B in FIG. 4 is shown in FIG. 6B where treatment sheet 40 of the present invention is sandwiched between the frame member 50*b* of FIG. 1C and the housing 20. As shown, a portion of the upper skin contacting surface 41 of the treatment sheet is coplanar to the underside surface 525 of the frame member 50*b* and a portion of the lower surface 42 of the treatment sheet 40 is coplanar with the housing step surface 211 or housing uppermost surface 213 (not shown). The housing 20 may comprise a housing step wall 212 which can be disposed between the housing step surface 211 and the housing uppermost surface 213 aiding in the location of the treatment sheet 40** on the housing, and ultimately in the entire assembly.

Unlike frame member **50*a* of FIG. 6A, the frame member 50*b* has rounded perimeters forming fillets 512 and 532 which provide comfort and ease of use of the product. In particular, frame member 50*b*, as noted above with regard to FIG. 1B, provides for a height 571 of the frame member at the outer perimeter that is generally the same as the height 561 at the inner perimeter and generally the same as that of frame member 50*a* in FIG. 6A, preferably about 0.2 mm to about 0.4 mm. That is because the surface 520 of frame member 50*b* is, like frame member 50*a*, also substantially flat. It is noted that the inner perimeter height 561 is beneficially small to allow a user's skin to be as proximal as possible to the upper surface 41 of the treatment sheet 40** during use.

A cross-sectional view **60*c* along plane B-B in FIG. 4 is shown in FIG. 6C where treatment sheet 40 of the present invention is sandwiched between the frame member 50*c* of FIG. 1E and the housing 20. Top skin contacting surface 41 of the treatment sheet is coplanar to the underside surface 525 of the frame member 50*c* and the lower surface 42 of the treatment sheet 40 is coplanar with the housing uppermost surface 213 and/or the housing step surface 211. As with FIGS. 6A and 6B, in FIG. 6C, the housing 20 may comprise a housing step wall 212 which can be disposed between the housing step surface 211 and the housing uppermost surface 213 aiding in the location of the treatment sheet 40** on the housing, and ultimately in the entire assembly.

FIG. 6C depicts a frame member **50*c* having a chamfered surface with a slope 521 on its outer skin contacting surface 520. As indicated, slope 521 is a downward slope, formed from an outer perimeter 570*a* at the retaining member's outer perimeter 570 to the inner perimeter 560*a* at the retaining member's inner perimeter 560. The perpendicular distance between inner perimeter 560*a* and the underside surface 525 of the frame member 50*c* define an inner perimeter height 561 of frame member 50*c*, of about 0.14 mm to about 0.18 mm and is preferably 0.16 mm. It is noted that the inner perimeter height 561 is beneficially small to allow a user's skin to be as proximal as possible to the upper surface 41 of the treatment sheet 40 during use, optimizing performance. The perpendicular distance between outer perimeter 570*a* and the underside surface 525 of the frame member 50*c* define an outer perimeter height 571 of frame member 50*c*** of about 0.2 mm to about 0.4 mm and preferably 0.3 mm.

Thus, perimeter portions of the treatment sheet 40, as shown in FIGS. 6A to 6C, are effectively "sandwiched" between the various types of frame members and the housing providing for robust support of the treatment sheet, i.e., prevents the treatment sheet from moving relative to the housing during use or breaking in case that the product is dropped. Furthermore, the sandwich aids precise location of the treatment sheet on the housing surface during assembly. It should be noted that for all retaining members 50*a*, 50*b*, 50*c* of the present invention depicted in FIGS. 6A to 6C, respectively, and for frame member 50*d* in FIG. 1D, the outer and inner perimeter heights provide a "guard-like" function in that, by having a distance above the cutting edges 435 of the treatment sheet 40, the skin of a user is protected, in that it is gradually allowed to flow into the treatment sheet's upper surface and cutting edges 435. In particular, the chamfered face or the downward slope 521 of FIG. 6C enables a user's skin to smoothly flow down from the highest point of the frame member to the treatment sheet's upper surface (e.g., a skin treatment surface) enabling optimal skin contact. This provides comfort during use.

A more detailed description of assembly of the housing 20, the treatment sheet 40 and the frame member 50 of the present invention is described below with regard to FIGS. 7 and 8.

Figure 7:
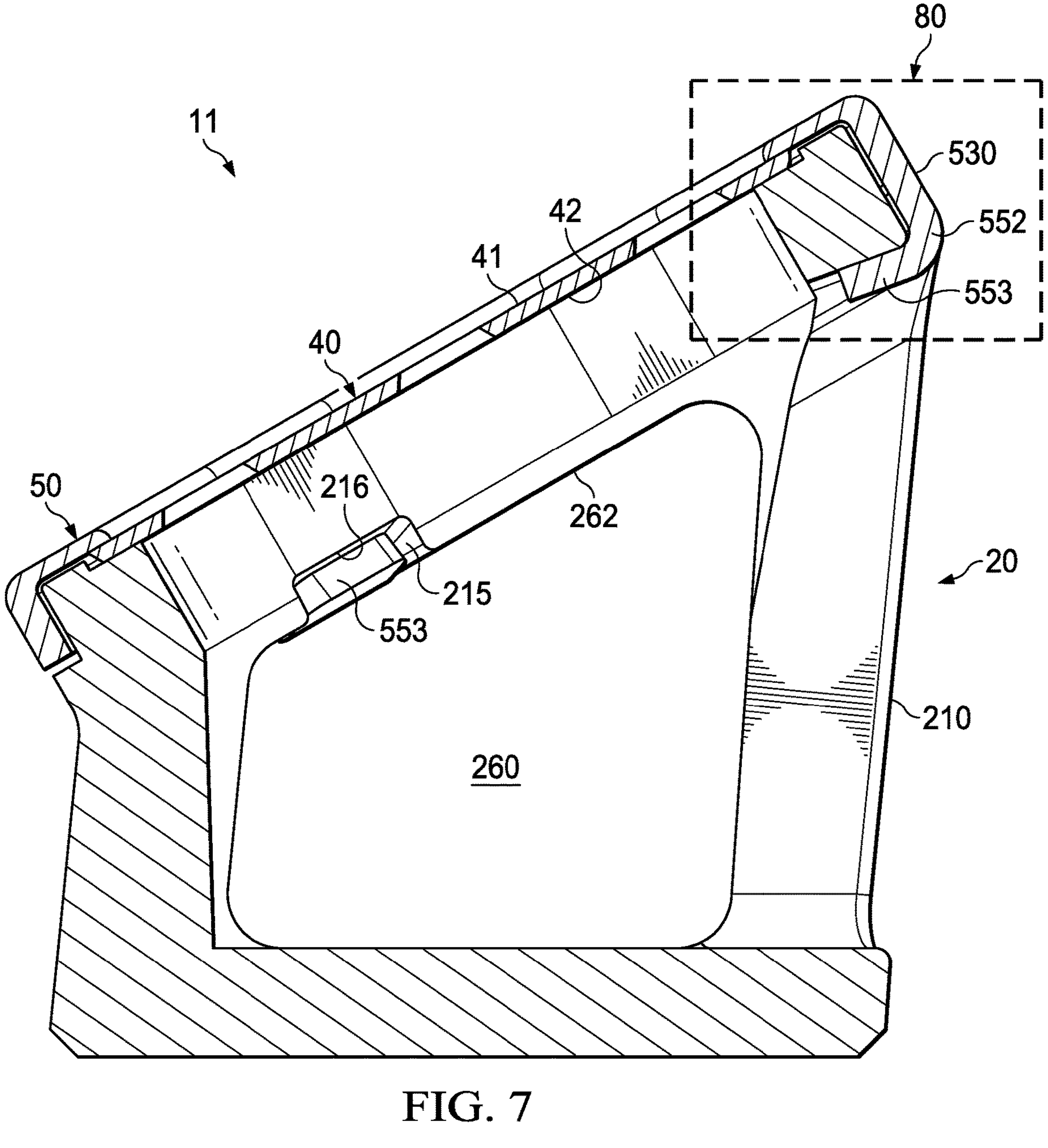
FIG. 7 depicts a cross-sectional view of FIG. 4 in accordance with the present invention.

FIG. 7 shows a cross-sectional view taken along plane C-C of FIG. 4 of the upper product end 11 of the personal care product 10 including the frame member 50 of the present invention. FIG. 8 shows a close-up view of interface area 80 of FIG. 7.

Figure 8:
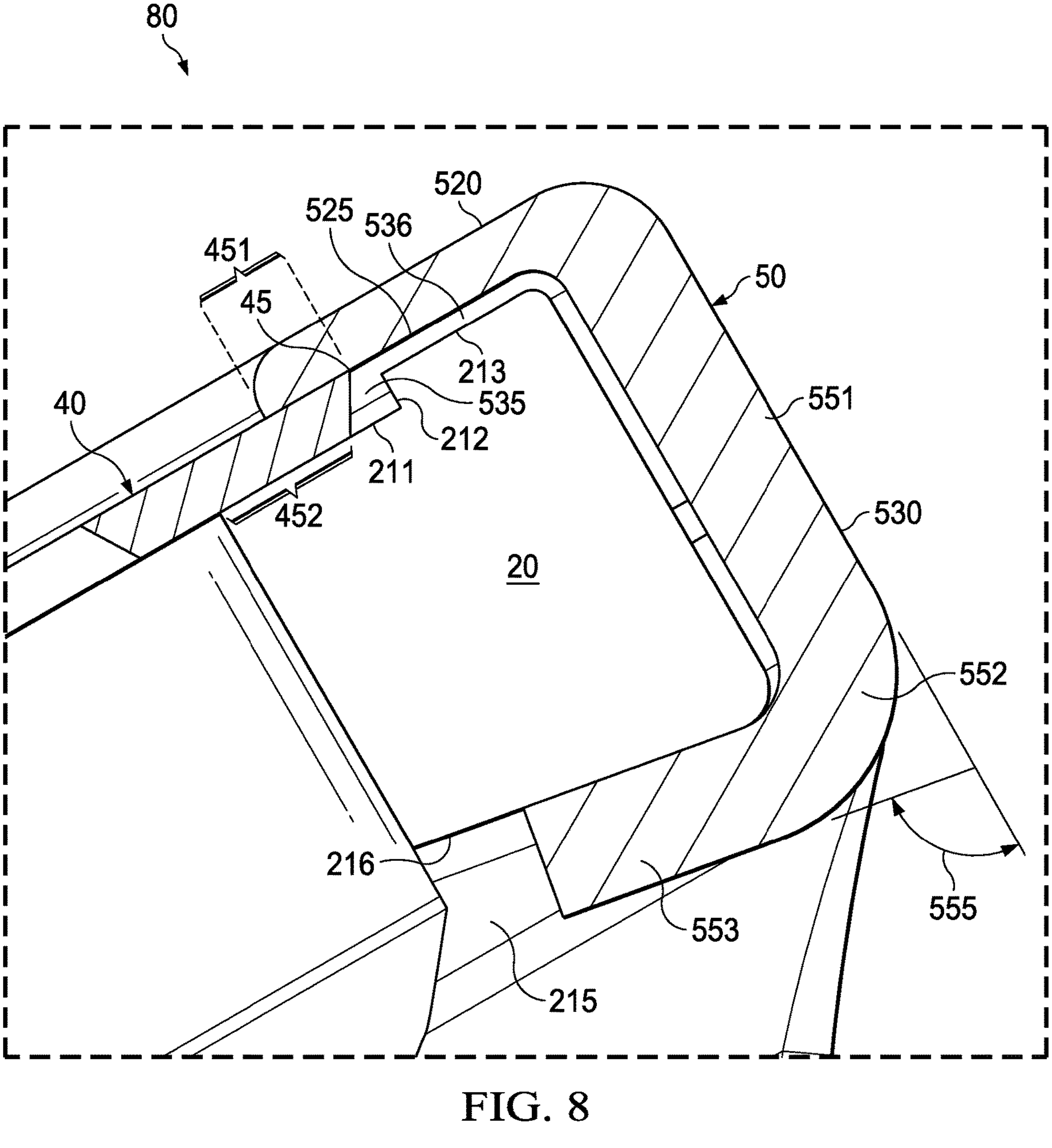
FIG. 8 is a close-up view of a portion of FIG. 7.

In FIGS. 7 and 8, the treatment sheet 40 fits between the frame member 50 and the housing 20 and is shown as being "sandwiched" coplanar between the housing 20 and the frame member 50. In particular, the frame member 50 is disposed over both an upper perimeter area 451 of the treatment sheet 40 and an upper surface 213 of the housing 20 shown in close-up view in FIG. 8. The lower perimeter area 452 of the lower surface 42 of the treatment sheet 40 is disposed on housing step surface 211. There remains a gap 535 between the edge around the outer perimeter 45 of the treatment sheet 40 and the housing step wall 212. The housing step surface 211 is generally lower than the top surface 41 of the treatment sheet 40. The presence of a gap 535 is generally desirable because it allows the treatment sheet to be assembled more easily into the housing and it provides accommodation for tolerances present on manufactured treatment sheets.

The frame member 50 serves to retain the treatment sheet 40 in a precise, controlled position on the housing 20 by means of one or more tabs 550 which extend from the frame member 50 and bend under the housing to secure the treatment sheet 40. The bent tabs provide securement of the treatment sheet in the housing. Thus, even if the personal care product 10 is accidentally dropped during use, the treatment sheet is stable and held in place. In FIGS. 7 and 8, shown assembled, are tabs 550 which extend from an outer wall 530 of frame member 50 and are disposed in a portion of the upper part of the housing 20. Specifically, as shown in FIG. 7, the tab end 553 of tab 550 is shown disposed in a window 260 on housing wall 210. The tabs 550 comprise a center section 552 which is bent below the upper straight section 551 into a notch 215 formed in the upper ledge 262 of the window 260 from outer housing wall 210. Tab end sections 553 are desirably directed inward and upward into the underside of the housing 20 of the notches 215.

There is a gap 536 between the underside 525 of the frame member and the housing uppermost surface 213 to ensure that the outer perimeter area 451 of the treatment sheet and the underside of the 525 of the frame member and the lower perimeter area 452 and the housing step surface 211 in close contact when the tabs of the frame member are bent and channeled into the notches during assembly of the product. The inward and upward shape of these notches generates a clamping force onto the sandwich when the tabs are wrapped around the outer housing wall 210 and channeled into the notches.

As shown in close-up view 80 in FIG. 8, the bent portion 552 of the tab 550 generally wraps-around the outer housing wall 210 and the upper ledge 262 of the window 260. A plurality of tabs or more is desirable to be formed on the frame member, more preferably three tabs on a frame member having a hexagonal shape. Multiple tabs ensure that the frame member locates coplanar to the treatment sheet and generates a clamping force evenly distributed around the housing.

As noted above, an angle 555 formed by the bent portion 552 is defined as the angle between the outer wall 530 of the frame member 50 and the roof of the notch 216 is greater than 90 degrees, preferably in the range of 95 to 135 degrees.

Figure 9B:
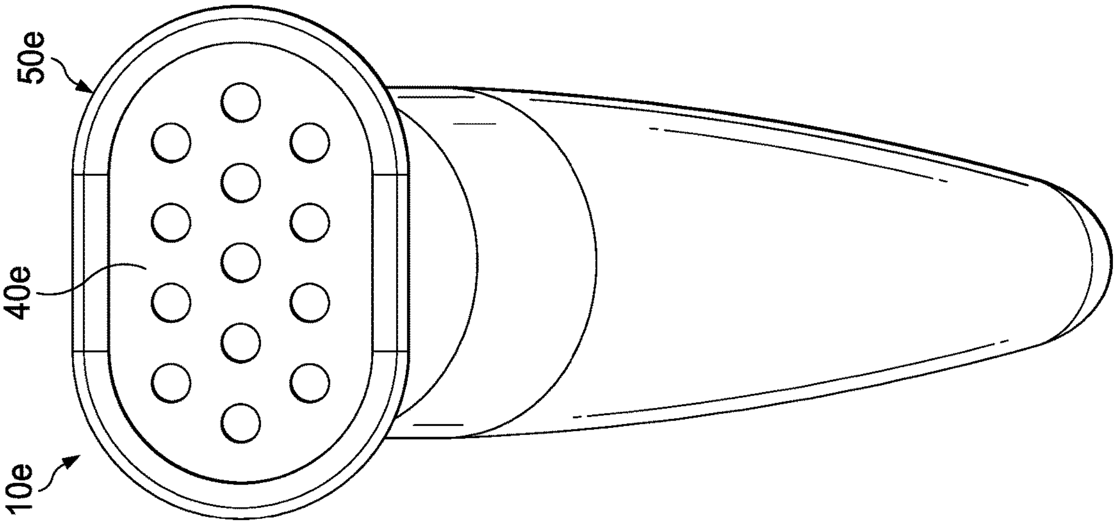
FIG. 9B shows a front view of a personal care product having the frame member of FIG. 9A.
Figure 9A:
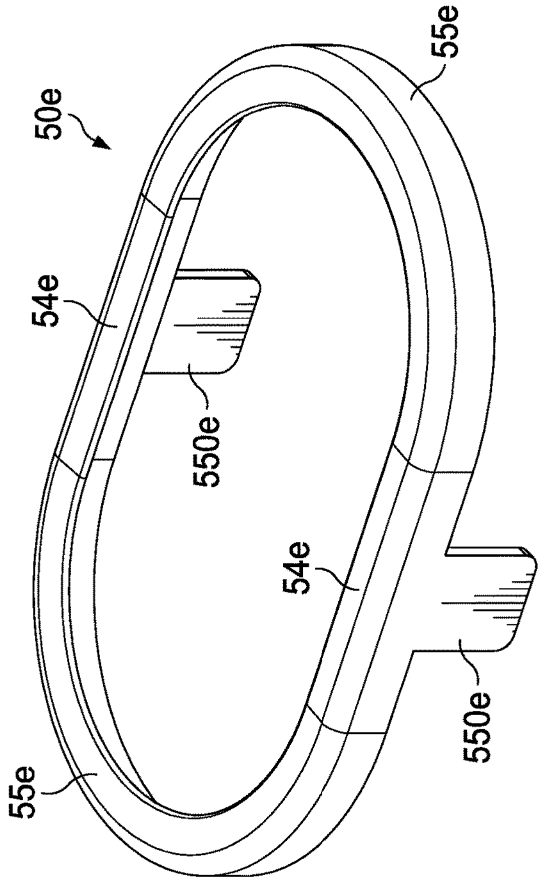
FIG. 9A shows an alternative embodiment of the frame member of the present invention.

Though a hexagonal frame member shape has been shown and described herein, the size and shape of the frame member of the present invention can be any feasible shape. As noted above, since the frame member is disposed over the treatment sheet, the treatment sheet shape may generally be the same shape, though any feasible arrangement is contemplated in the present invention. For instance, referring to FIGS. 9A and B, an alternate embodiment of a frame member 50*e* is shown having an oval shape, two straight sections 54*e*, two corner sections 55*e*, and two tabs 550*e* (shown prior to bending). Personal care product 10*e* in FIG. 9B is shown having frame member 50*e* disposed thereon along with an oval shaped treatment sheet 40*e* sandwiched therebetween.

Figure 10:
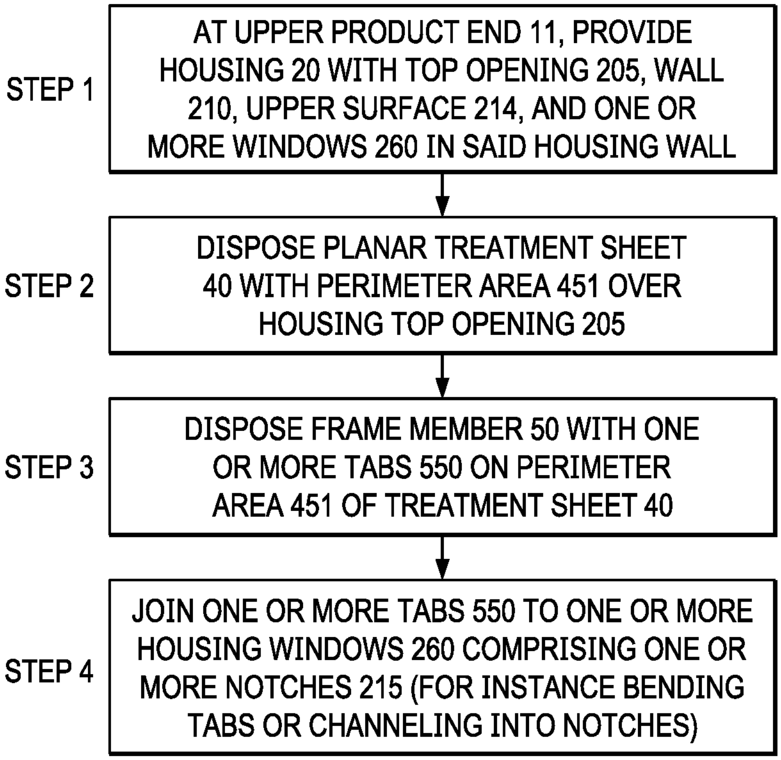
FIG. 10 shows a flow diagram of a method of assembling a personal care product having a frame member of the present invention.

A non-limiting method of manufacturing or assembling a personal care product having a frame member of the present invention is shown in the flow diagram of FIG. 10. At Step 1, the initial step of providing a housing 20 is depicted. The housing of Step 1 comprises an upper surface 214, a housing top opening 205, a housing wall 210 and one or more windows 260 in the housing wall. The housing of Step 1 is disposed at the upper product end 11. At Step 2, the step of providing a treatment sheet 40 over the housing top opening 205 and on the upper surface of the housing is shown. The treatment sheet of Step 2 of the present invention is preferably planar, has a perimeter area, and is a skin treatment sheet capable of treating both the skin and removing hair. At Step 3, a frame member 50 is provided at step 1 comprising one or more tabs 550. Also provided at Step 3, is disposing the frame member on the perimeter area of the treatment sheet. In addition, the frame member may also be disposed on a surface of the housing such as the upper surface of the housing. In a final step of assembly, at Step 4, the one or more tabs of frame member provided in Step 3 are joined to the one or more windows of the housing of step 1. Thus, after Step 4, the treatment sheet is sandwiched in between the housing and the frame member. Step 4 also can comprise a step of bending the one of more tabs into the one or more windows of the housing, channeling the one or more tabs into one or more notches in the one or more windows of the housing, or both. Step 4 can also further comprise the step of providing a gap between an outer perimeter of the treatment sheet and a housing wall. The joining steps of Step 4 secure the frame member to the housing while also retain the treatment sheet in the product, keeping it in place to avoid movement or sliding out of place.

Any other feasible arrangements of frame members and treatment sheets are also contemplated by the present invention.

The illustrations presented herein are not intended to be actual views of any particular substrate, apparatus (e.g., device, system, etc.), or method, but are merely idealized and/or schematic representations that are employed to describe and illustrate various embodiments of the disclosure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." The term "about" as used herein generally signifies approximately or around. As one example, when a range of numerals are given, e.g., if "about 4 to about 40" is or "4 to 40" is disclosed herein, the present invention contemplates the recited value of "4" and "40" and a functionally equivalent range surrounding each of the 4 and the 40, which can generally be plus or minus 10 percent of each number. Thus, for clarity, if a reference is described as being "4 to 40" this signifies it could be a functionally equivalent range of 4 and a functionally equivalent range of 40 or "about 4 to about 40." The latter signifies the range of "3.6 to 44" as being encompassed by the present invention since the range of 3.6 to 4.4 represents plus and minus 10 percent of 4, respectively and the range of 36 to 44 represents plus and minus 10 percent of 40, respectively.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover, in the appended claims, all such changes and modifications that are within the scope of this invention.

What is claimed is:

1. A personal care product comprising:

a flat treatment sheet having an upper surface and a perimeter area on said upper surface;

a housing wherein the housing has one or more housing upper surfaces, and a housing wall;

a frame member having an underside surface and at least one tab, wherein said frame member is disposed over said perimeter area of said flat treatment sheet and said underside surface of said frame member is coplanar with said upper surface of said flat treatment sheet and said at least one tab extends below the flat treatment sheet; and wherein the at least one tab extends over and into a portion of an outer surface of the housing wall.

2. The personal care product of claim 1 wherein said flat treatment sheet is rigid.

3. The personal care product of claim 1 wherein said flat treatment sheet has a plurality of apertures each of said plurality of apertures having an inner perimeter.

4. The personal care product of claim 1 further comprising an upper product end wherein said upper product end comprises the housing wherein said housing further comprising one or more of a housing step surface, at least one housing window formed in the housing wall, or any combination thereof.

5. The personal care product of claim 4 wherein said at least one tab is bent into said housing window.

6. The personal care product of claim 1 wherein said frame member comprises a plurality of tabs in addition to said at least one tab.

7. The personal care product of claim 1 wherein said flat treatment sheet treats skin, removes hair, or a combination thereof.

8. The personal care product of claim 1 wherein said frame member comprises a flat upper surface or a chamfered upper surface.

* * * * *